(12) United States Patent
Huang (10) Patent No.: US 7,376,287 B2
(45) Date of Patent: May 20, 2008

(54) METHOD FOR INTELLIGENT AUTO-ORIENTATION OF DIGITAL IMAGES

(75) Inventor: Ho-Chao Huang, Taipei Hsien (TW)

(73) Assignee: CyberLink Corp., Hsin-Tien, Taipei Hsien (TW)

( * ) Notice: Subject to any disclaimer, the term of this patent is extended or adjusted under 35 U.S.C. 154(b) by 708 days.

(21) Appl. No.: 10/711,949

(22) Filed: Oct. 15, 2004

(65) Prior Publication Data

US 2006/0083441 A1  Apr. 20, 2006

(51) Int. Cl.
G06K 9/32 (2006.01)
G09G 5/00 (2006.01)
G06K 9/36 (2006.01)

(52) U.S. Cl. .................... 382/297; 382/293; 345/658

(58) Field of Classification Search ................ 382/293, 382/295, 296, 297, 289, 276; 345/649, 654, 345/655, 658, 659
See application file for complete search history.

(56) References Cited

U.S. PATENT DOCUMENTS 5,649,033 A * 7/1997 Morikawa et al. .......... 382/297
5,875,035 A * 2/1999 Motosugi et al. ........... 358/296
6,144,777 A * 11/2000 Tada et al. .................. 382/284
6,314,213 B1 * 11/2001 Miyahara et al. ........... 382/312
6,606,451 B2 * 8/2003 Honda et al. ................. 386/95
6,727,909 B1 * 4/2004 Matsumura et al. ........ 345/629
2004/0169881 A1 * 9/2004 Sato ......................... 358/1.15

* cited by examiner

Primary Examiner—Yon J. Couso
(74) Attorney, Agent, or Firm—Winston Hsu (57) ABSTRACT

A method for re-orientating digital images in an image-editing environment where images are loaded in landscape mode by default, with the aim of unburdening users from the inconvenience of manual correction of image orientation. Intelligent re-orientation of digital images is realized by analyzing an image in order to determine if re-orientation is required, using image zone analysis processes and facial feature analysis and, by the information provided by the same processes, also determining the direction and scale of correction need to render an image correctly orientated with respect to a user.

17 Claims, 12 Drawing Sheets

| Scenery Element | Class Factor |
|---|---|
| Sky | 60 |
| Water | -20 |
| Concrete | 10 |
| Grass | -20 |
| Sand | -20 |
| Asphalt | -30 |

| Scenery Element | Class Factor | | | |
|---|---|---|---|---|
| | Zone A | Zone A' | Zone B | Zone B' |
| Sky | 60 | 50 | 60 | 50 |
| Water | -20 | -30 | -20 | -30 |
| Concrete | 10 | 10 | 10 | 10 |
| Grass | -10 | -20 | -10 | -20 |
| Sand | -20 | -30 | -20 | -30 |
| Asphalt | -30 | -40 | -30 | -40 |

METHOD FOR INTELLIGENT AUTO-ORIENTATION OF DIGITAL IMAGES

BACKGROUND OF THE INVENTION

1. Field of the Invention

The present invention relates to a method for the automatic orientation of digital images in an editing environment.

2. Description of the Prior Art

In the field of photography, it is becoming increasingly common for both professional and amateur photographers to choose a digital means of image capture and storage over more conventional means. One of the advantages of digital image storage is the ease with which users can edit images, and furthermore, while professional image editing software may have higher system requirements, most home computers manufactured in recent years are capable of hosting adequate image editing packages. This has meant that new levels of simplicity and flexibility have been introduced to users spanning the range from amateur home user to studio based professional, and accordingly, software designers continue to add value and improvements in functionality.

In prior art image-editing environments, images are generally loaded into memory in landscape mode (i.e. long axis in the horizontal plane) by default, hence, one editing procedure that must be carried out by users is the re-orientation of images; that is, arranging images shot in portrait mode (i.e. images that should have their long axis in the vertical plane but are effectively viewed on their sides due to the standard landscape mode default), so that they are, put simply, the correct way up.

For the amateur with a limited number of images to process, the need to carry out the above mentioned procedure might be merely inconvenient, however, for the professional the task of correcting a large number of images becomes an onerous prospect, and in both cases is a task of which users may reasonably expect could be carried out by automatic processing of the image.

There is reasonable need then, by way of a refinement to an image-editing environment, for a facility by which the orientation of images is automatically corrected if required.

SUMMARY OF THE INVENTION

The present invention describes a method for re-orientating digital images in an image-editing environment. Re-orientation of digital images is realized in the present invention by a process that includes analyzing an image stored in a computer readable media and determining an image re-orientation requirement according to an image analysis output, determining a direction of re-orientation of the image according to said re-orientation requirement, and re-orientating the image according to said determined direction of re-orientation.

These and other objectives of the present invention will no doubt become obvious to those of ordinary skill in the art after reading the following detailed description of the preferred embodiment that is illustrated in the various figures and drawings.

DETAILED DESCRIPTION

The method described below is suitable for implementation, for example, when a digital image is loaded into an image-editing environment (the term "image-editing environment" in this sense refers to image editing or review software running on a suitably equipped computing device or dedicated digital image processor), or when a loaded image is first opened or selected for previewing. The present invention can be a default function of the computing device image-editing environment, or a user selectable function. As mentioned above, images are generally loaded in landscape mode, i.e. with the long axis of the image in the horizontal plane. The invention described treats each image with a variety of image analysis techniques in order to make a judgment regarding the re-orientation of the image if, for example, the image was shot in portrait mode and otherwise would be presented incorrectly, i.e. on its side. Of course, the portrait and landscape modes are merely well accepted conventions, which some images will fall outside of. For this reason, further refinements are included in the present invention as described below.

In a preferred embodiment (given by way of example, as it should be understood that because Bayesian techniques can be involved in image analysis, the possible variations in the order and exact nature of the processes involved, are numerous), an image may first be treated using a basic human face recognition technique. There are a variety of established algorithms for the recognition of human faces, and any suitable algorithm may perform the recognition function in the described method, however, the present invention requirement is simply to identify the presence and orientation of facial features, hence a 'stripped-down' algorithm is utilized to improve speed and keep processing overheads to a minimum.

Figure 1:
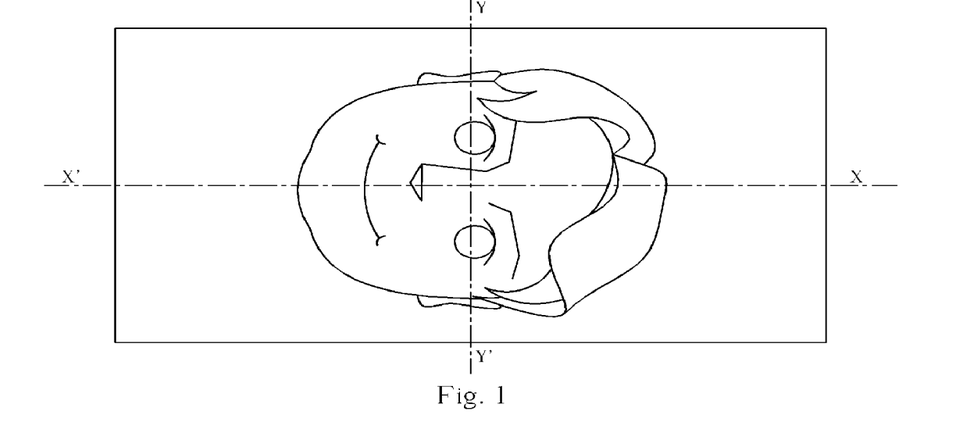
FIG. 1 Is an example portrait mode image showing human facial features.

A close-up format facial image shot in portrait mode as shown by FIG. 1 and having perpendicular axes X-X' & Y-Y', would be a good candidate for re-orientation without further processing. By assessing the relative position of the principal facial components and the dominance of the face within the image, an algorithm can attribute a large 'weighting potential' to the long axis X-X' of the image, i.e. a measure of the probability that the long axis X-X' should be in the vertical plane. The algorithm will also generate a weighting potential for the short axis Y-Y', although for this image the probability that the short axis Y-Y' should be in the vertical plane is low, hence so will the attributable weighting potential. The relative values of the weighting potentials for the axes are used to determine which of the axes is the dominant axis, i.e. has the largest axis weighting potential. The dominant axis is so called because its properties are determined to be such that it should 'most likely' be aligned in the vertical plane. However, 'most likely' does not mean 'certainly', and so other factors, such as the background, must be taken into account provided they are significant enough. The difference in the weighting potentials for the axes is used as a basis for deciding the necessity for, and direction of, re-orientation, i.e. deciding the question, 'is the dominant axis dominant enough?' This process will be described in more detail later.

The example image of FIG. 1 has facial features that obviously dominate the frame, hence for such images where there is no evidence to contradict the requirement for re-orientation, for example horizon lines or other indicators detectable by more sophisticated embodiments, further analysis may be omitted and re-orientation commenced. In the preferred embodiment, a threshold is employed, this being a predetermined value above which the assessed significance of the detected facial features is deemed great enough initiate re-orientation of the image and exclude the need for further image analysis.

Figure 2:
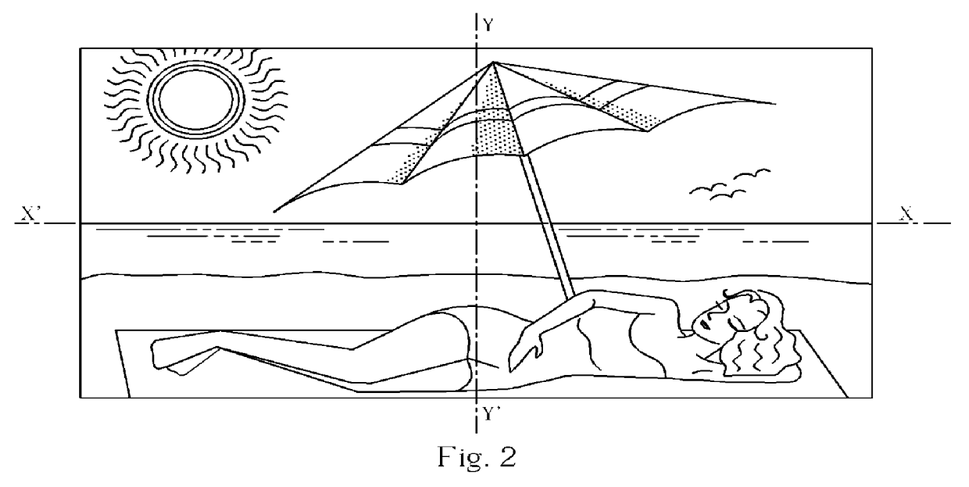
FIG. 2 Is an example landscape mode image showing human facial features against a background with a broader context.

However, the smaller a face is relative to the image as a whole, the greater is the probability of the background being significant. Consider the example image shown in FIG. 2; taken in isolation, the orientation of the facial features in this image are similar to those in FIG. 1, hence the image would make a good candidate for re-orientation, although taken in context with the other key elements in the image, it can be seen that no re-orientation is required. Therefore, the above-mentioned threshold is set at a level that excludes such facial features from influencing the weighting potential for the relevant axis (in this case the long axis X-X'). Without conclusive grounds for re-orientation at this stage, another image analysis technique must be used to assess the remainder of the image elements.

Figure 3:
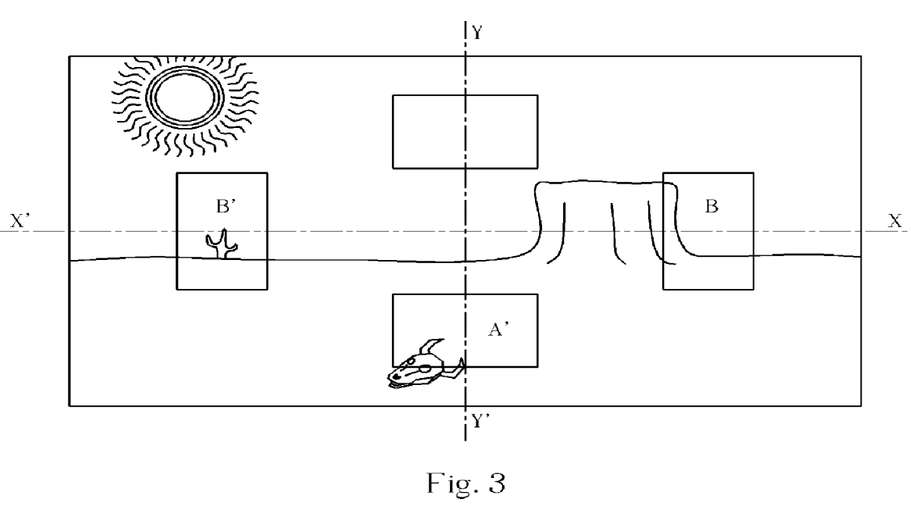
FIG. 3 Is an example landscape mode image showing a scene with analysis zones superimposed.

Another image analysis technique is image zone analysis. In the absence of any human facial features, or, if as in the preferred embodiment, a threshold level for deciding facial feature significance is set (below which such image elements are deemed insignificant), or for any of the reasons mentioned below, an image zone analysis technique is used. FIG. 3 shows examples of sampling zones for an image zone analysis technique. The short axis of the image, Y-Y' is assessed by analysis of two predetermined zones, A & A', similarly the long axis, X-X' is assessed by analysis of predetermined zones B & B'. The zones in FIG. 3 are shown by example and may vary in size and shape in alternate embodiments. Each zone is compared to predefined patterns characterizing common image element classes and a 'class probability rating' returned for each class, for example, in FIG. 3 analysis of zone A would return a high probability for the class of 'sky', and a low probability for the class of 'sand'. A 'zone probability rating' is then created using the highest of the class probability ratings for each zone; the selected class probability rating is multiplied by a 'class factor', i.e. a predetermined factor for that particular class, stored in a look-up table. While the class factors may be identical for all zones, they may also be zone specific to allow a greater degree of accuracy (this point will be expanded by example later). Assuming that, using arbitrarily assigned values by way of example, image analysis of zone A returns a class probability rating of 80 for the class of 'sky', and the class factor for sky for zone A is 100, a zone probability rating of 80×100=8000 would result.

Applying the same technique to zone A', a highest class probability of 85 is returned for the class of 'sand', and multiplying by the appropriate class factor, that being −60, results in a zone probability rating of −5100.

The final calculation in the assessment of axis Y-Y' is the derivation of an 'axis weighting potential', this being the differential between the zone probability ratings of zones A & A'. Taking the two figures given by example, the axis weighting potential for axis Y-Y' is 13,100. A large, positive figure such as this gives a strong indication that the image is correctly orientated (a significant negative figure indicating the axis, and thereby the image, may be inverted), however, axis X-X' must also be assessed. Referring again to FIG. 3, it can be seen that the analysis of zones B & B' will be less determinate than that of A & A'; both zones comprise a mix of elements and are broadly similar in composition, hence the resulting axis weighting potential will be much smaller than that derived for axis X-X'. Re-orientation of the image is only initiated if, primarily, the axis weighting potential of axis X-X' is greater than the axis weighting potential of axis Y-Y' (by a predetermined margin, see below), or secondarily, if as mentioned above, the weighting potential of axis Y-Y' is a significant negative number (or below a predetermined level in systems where negative numbers are inconvenient or unfeasible). In both cases, a threshold may be built into the differential required to bring about re-orientation of an image, this threshold being a default setting, a process variable or a user defined setting.

As none of the above applies in this case, the image is not eligible for re-orientation, hence no further action would be taken.

The rationale applied to deciding which of the various techniques are employed may be influenced by factors derived from previous images. For example, if an image were closely related in terms of time and date to a batch of previous images, it would be likely to have been shot as part of the same 'session'. And if then, all the previous images in the session had been very similar compositions, a particular seascape for example, it would be more efficient in terms of time and processing resources to treat the image by a suitable image zone analysis technique, as there would be a reasonable chance that no human face characteristics would be present in the image. The session grouping rationale is only one example of factors that may be considered when deriving an analysis strategy for an image. Other factors may include time of day, season, historical data on user usage (e.g. the development of a trend wherein a user consistently manually re-orientates images with some common attribute (s)), and user determined preferences. Additionally, as certain digital cameras are capable of detecting the orientation in which each particular image is shot, it's possible that images may be imported having already been re-orientated, or having their computer readable properties suitably annotated. In the case of the former, the instant invention may take no further action (depending upon user preferences), and in the case of the latter, orientation information will be read from the image properties and the image re-orientated accordingly.

For all the above processes depending upon image properties, the present invention draws upon predefined data relating to the established standards, well known within the art, pertaining to each compatible image format for comparison purposes.

Figure 4:
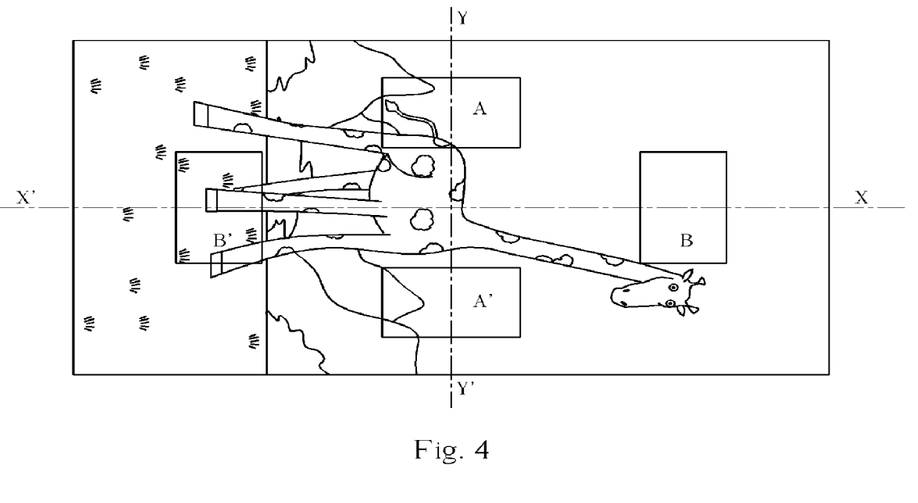
FIG. 4 Is an example portrait mode image showing a scene with analysis zones superimposed.
Figure 5:
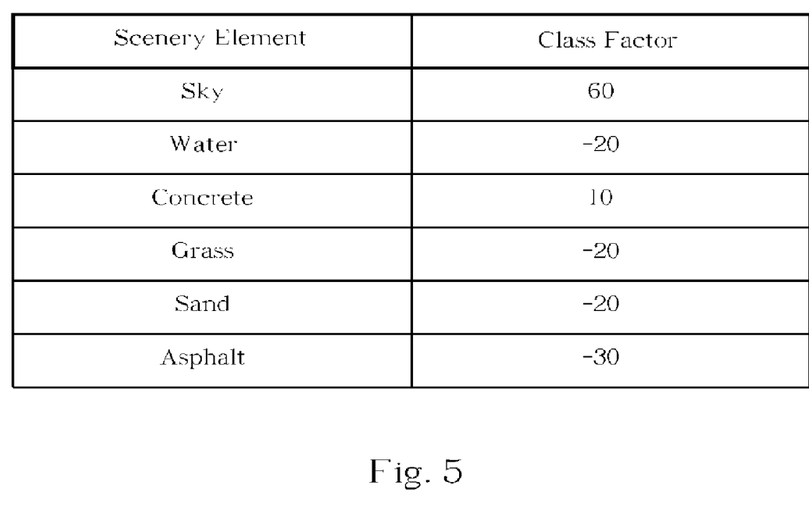
FIG. 5 Illustrates an example of a class factor look-up table.

Please consider the following example referring to the image shown in FIG. 4. The image depicted in FIG. 4 is loaded in the default landscape mode, as would that of FIG. 3, however, as can be appreciated by a human observer, portrait mode would be more appropriate. Assuming no basis for re-orientation is found in the image properties, and no human facial features are evident in the example image (FIG. 4), image zone analysis is applied. The similar compositions of zones A & A' will result in a low order of axis weighting potential for axis Y-Y', whereas analysis of zones B & B' will result in a high order of axis weighting potential for axis X-X' because of the differential between the dominant elements in the respective zones. Using assumed class probability rating values and a class factor look-up table (given by way of example in FIG. 5), it can be seen that a zone probability rating for zone A may be derived by the determination of a class probability rating of say, 80% for the class of 'sky', then, providing no other class scored a higher probability rating, multiplication of the dominant class probability rating by the appropriate class factor. In this example it is assumed that all zones will use the same class factor table, however, as mentioned above, where greater flexibility and accuracy is required, each zone may have a separate look-up table or separate entry in a combined look-up table. Thus utilizing the following formula:

$$CPR \times CF = ZPR$$

Where:
CPR is Class Probability Rating;
CF is Class Factor; and
ZPR is Zone Probability Rating.
then:

$$80 \times 60 = 4800$$

Similarly, assuming a class probability rating of 85% for the class of 'sky' for zone A', would produce a zone probability rating of 5100. An axis weighting potential for Axis Y-Y' can be found by the following calculation:

$$\text{Zone } A \ PR - \text{Zone } A' \ PR = \text{Axis } Y\text{-}Y' \ WP$$

Where:
PR is Probability Rating; and
WP is Weighting Potential.
giving:

$$4800 - 5100 = -300.$$

Next, considering axis X-X', zone B returns a dominant class probability rating of 75% for the class of 'sky', and zone B' 65% for the class of 'grass'. Using the method above, the probability rating is 75×60 (see FIG. 5)=4500 for zone B, and 65×(−20) (see FIG. 5)=−1300 for zone B'. The axis weighting potential that can be derived for axis X-X', is 5800, which is significantly greater than that derived for axis Y-Y', and would lead to reorientation i.e. the rotation of the image so as to place axis X-X' in the vertical plane, unless the axis differential threshold were set above 6100. The orientation of the dominant axis in the vertical plane is decided in accordance with a second threshold; the axis weighting potential for axis X-X' in this case is 8800, a significant positive number indicating a high probability that the image is correctly orientated when appearing as X'-X when viewed from top to bottom. A significant negative number may be required (depending, of course, at what level the second threshold is set), say −1000 or above for this example, before reorientation of the axis is initiated, thus appearing as X'-X when viewed from top to bottom. It is entirely possible for an axis with a large negative value to be identified as the dominant axis, because dominance is decided upon by the magnitude of the relevant axis weighting potential.

Where a system utilizing signed numbers is inconvenient or unworkable for any reason, a system scaled entirely using positive numbers may be substituted; the values herein are given by example only.

Figure 6:
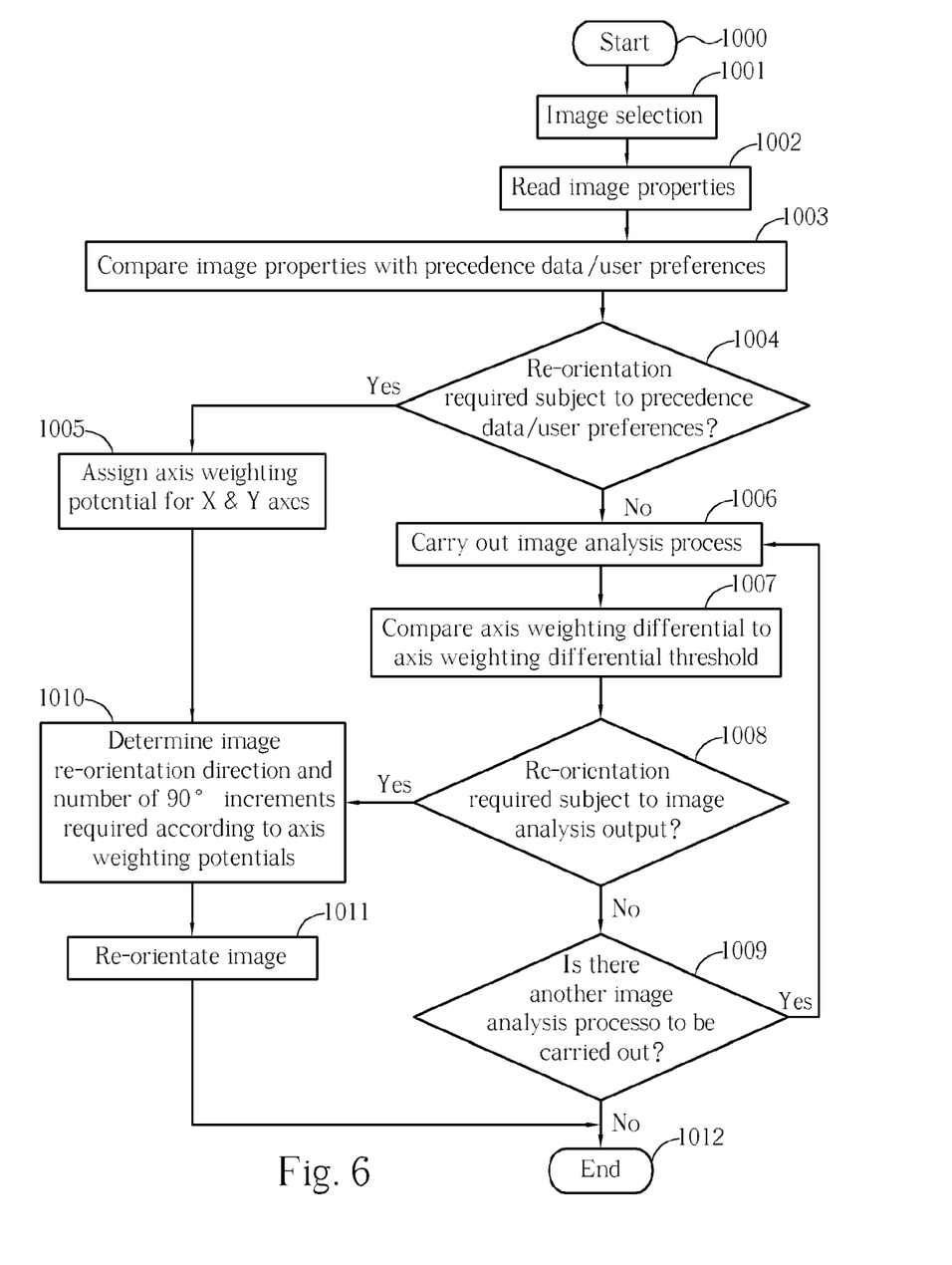
FIG. 6 Illustrates a flow diagram of the method of a preferred embodiment of the present invention.

FIG. 6 shows a flow diagram detailing the preferred embodiment process demarcated into the following steps:

Step 1000: Process starts.

Step 1001: A new image is selected by means including initial loading into the image-editing environment ('new' in this case means an image that has not been previously included in the image-editing environment—this is assumed to mean that the image will be loaded in landscape mode by default), being selected for opening for a first time or being selected for previewing for a first time.

Step 1002/3: Image file properties are read in case information therein, such as session/time/date or source device orientation data as mentioned above, can help reduce processing time by the omission of subsequent image processing steps.

Step 1004: If step 1002/3 yields any usable data, a decision on whether the data is a strong enough indicator to justify re-orientation of the image, and in what sense, is made. If re-orientation is justified then the process proceeds to step 1005, otherwise the process proceeds to step 1006.

Step 1005: Necessary values are assigned to subject image axes to ensure compatibility with subsequent processes.

Step 1006: In the absence of any useful indicators being returned from step 1003, the image is processed by an image analysis process. In this embodiment, the image analysis process comprises an image zone analysis and a facial feature analysis process; these processes may be carried out in either order, i.e. image zone analysis followed by facial feature analysis or vice-versa as per system or user setting/default setting. Upon completion, each image analysis process (which may be regarded as preferred embodiment sub-processes) returns analysis results to the preferred embodiment process.

Step 1007: The axis weighting differential, i.e. the difference in the axis weighting potentials of the X-X' and Y-Y' axes of the image, is compared to an axis weighting differential threshold and the result passed to step 1008.

Step 1008: A decision is made regarding whether re-orientation of the image is required, based upon the output of step 1007, i.e. is the axis weighting differential above the axis weighting differential threshold? If the axis weighting differential is above the axis weighting differential threshold then re-orientation is required and the process proceeds to step 1010, otherwise the process proceeds to step 1009.

Step 1009: A decision is made regarding whether another image analysis process is to be performed (in this embodiment an image analysis count is reset when a new image is loaded and incremented each time an image analysis process takes place) or not. If another image analysis process is to be performed the process loops back to step 1006, otherwise the present invention process is terminated at step 1012. Please note that if the image analysis process comprises only one image analysis sub-process, step 1009 can be omitted.

Step 1010: If re-orientation is determined as being necessary by step 1004 or 1008, then the re-orientation direction and angular distance (in the preferred embodiment the axes are rotated clockwise or counter clockwise in 90° increments as required) required to correctly orientate the dominant axis i.e. the axis having the highest order of axis weighting potential, in the vertical viewing plane is determined.

Step 1011: Finally, the image is re-orientated according to the output of step 1010.

Step 1012: The present invention process terminates.

Figure 7:
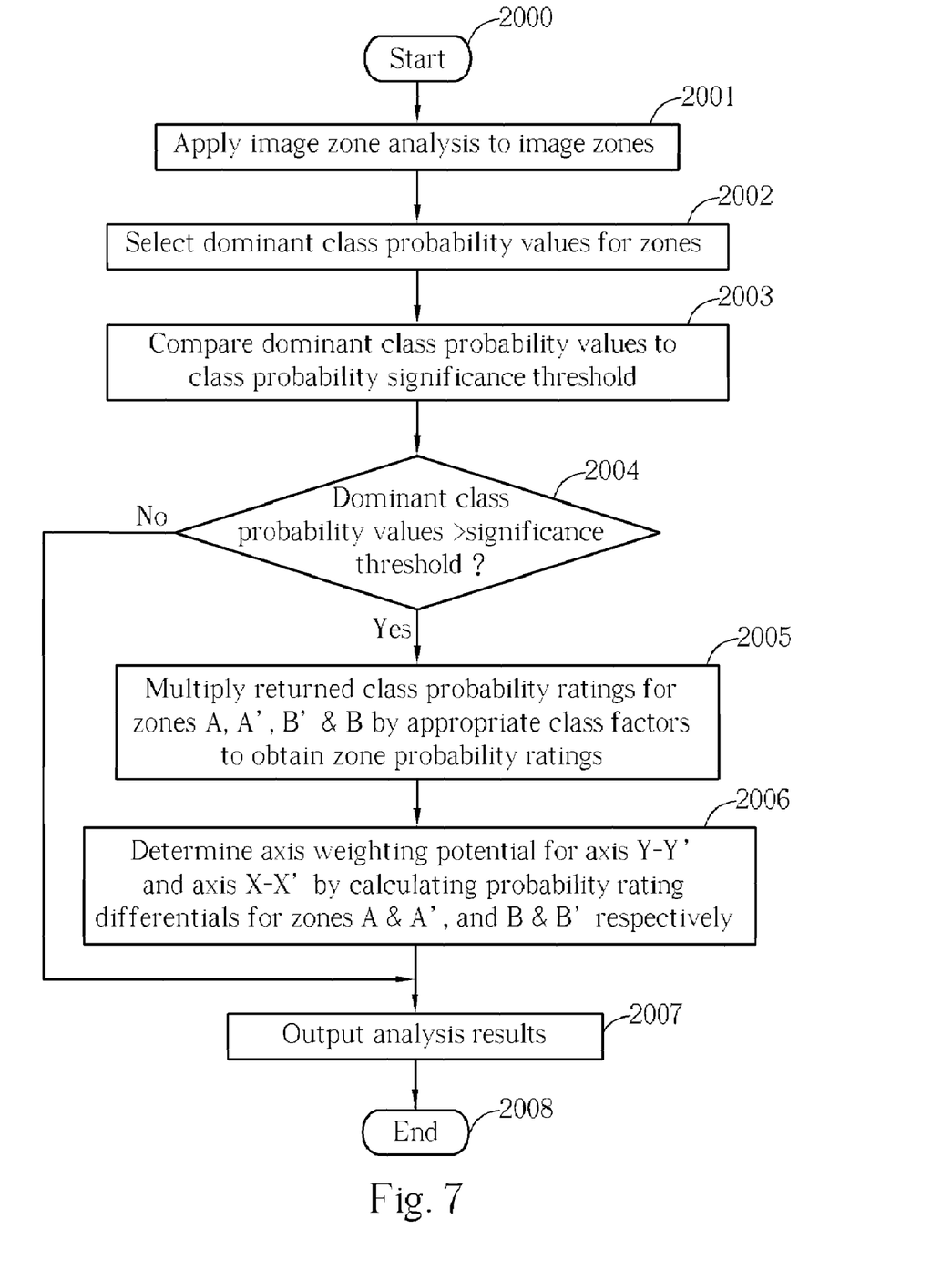
FIG. 7 Illustrates a flow diagram of the image zone analysis process of a preferred embodiment of the present invention.

FIG. 7 shows a flow diagram detailing the image zone analysis process presented as a sub-process of the preferred embodiment and demarcated into the following steps:

Step 2000: Sub-process starts.

Step 2001: Image zone analysis process is applied to the image as described above, and class probability ratings are returned by the analysis process.

Step 2002: The dominant class probability rating is selected for each zone from the values returned by the image zone analysis process.

Step 2003: The dominant class probability rating values are compared to a class probability significance threshold (the level of which is selected to ensure a null result is returned to the preferred embodiment process if the image is unrecognizable to image zone analysis).

Step 2004: A decision is made regarding whether the dominant class probability rating values are significant enough to warrant further processing. If the dominant class probability rating values exceed the threshold then the sub-process proceeds to step 2005, otherwise the sub-process proceeds to step 2007 and thus returns a null result.

Step 2005: Zone probability ratings are calculated for each zone by multiplying the class probability ratings of step 2002 with appropriate predetermined class factors (refer to FIG. 5 by way of example).

Step 2006: Axis weighting potentials for axis Y-Y' and axis X-X' are determined by calculating the probability rating differentials for the zones pertinent to each axis, i.e. zones A & A' and zones B & B' respectively.

Step 2007: The result of step 2006 is output to the preferred embodiment process (FIG. 6, step 1007). A null result is returned if step 2004 passes a negative (i.e. dominant class probability rating values below significance threshold) result.

Step 2008: The sub-process terminates.

Figure 8:
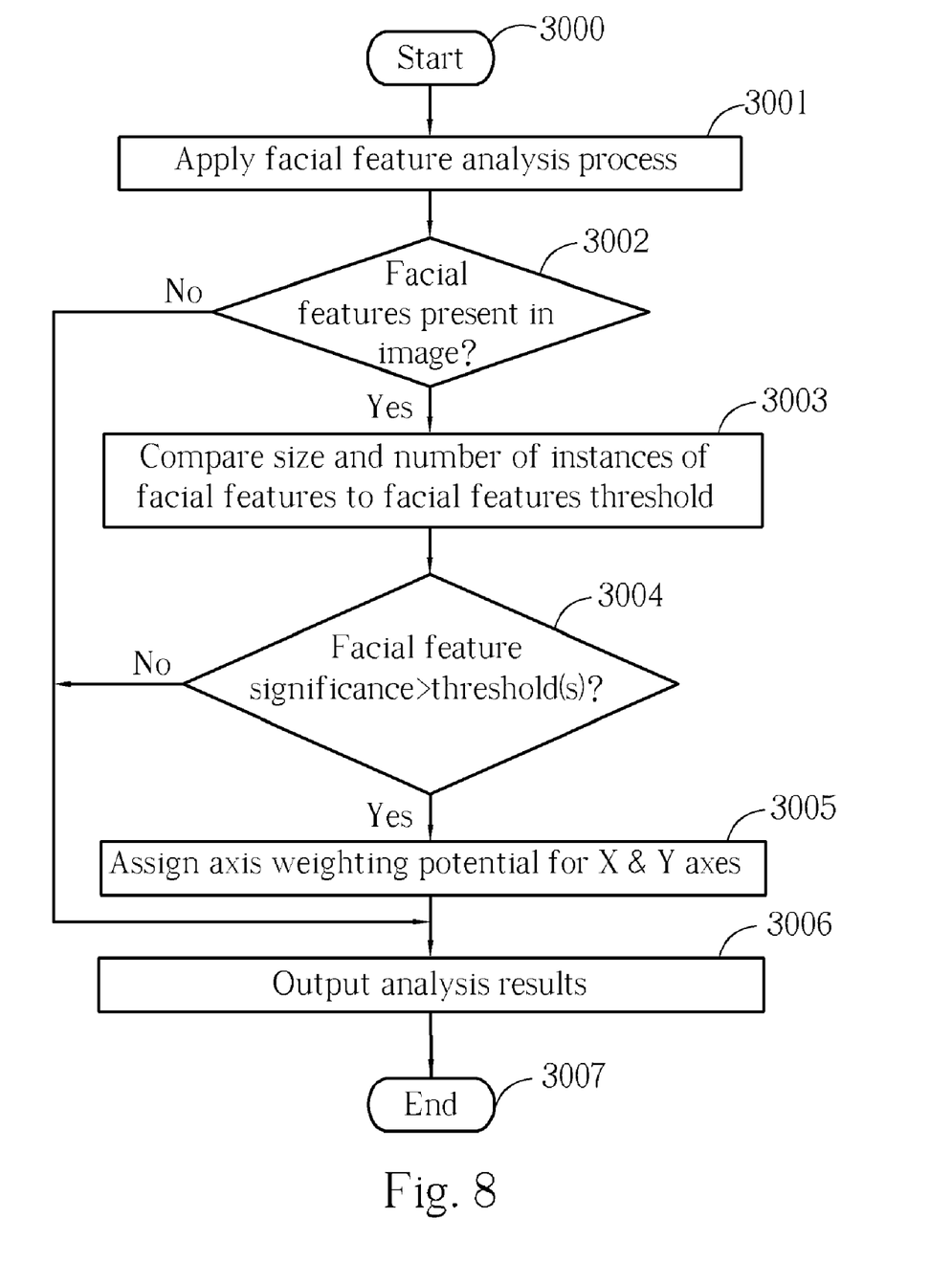
FIG. 8 Illustrates a flow diagram of the facial feature analysis process of a preferred embodiment of the present invention.

FIG. 8 shows a flow diagram detailing the facial feature analysis process presented as a sub-process of the preferred embodiment and demarcated into the following steps:

Step 3000: Sub-process starts.

Step 3001: Facial feature analysis is applied to the image as described above.

Step 3002: If no human facial features are evident in the image, there is no basis for re-orientation at this stage and the sub-process proceeds to step 3006, hence returning a null result to the preferred embodiment process. Otherwise, the sub-process proceeds to step 3003.

Step 3003: If human facial features are evident, the size of the features and number of instances of features are assessed by comparison to predetermined thresholds.

Step 3004: A decision is made on the significance of the facial features, based upon the assessments generated by step 3003. If the significance rating of the facial features exceeds a predetermined threshold then the sub-process proceeds to step 3005. Otherwise, the sub-process proceeds to step 3006, hence returning a null result to the preferred embodiment process.

Step 3005: Axis weighting potentials for axis Y-Y' and axis X-X' of the image are assigned according to the output of the facial feature analysis process of step 3001.

Step 3006: The results of step 3005 are output to the preferred embodiment process (FIG. 6, step 1007). A null result is returned if steps 3002 or 3004 pass negative (i.e. dominant class probability rating values below significance threshold) results.

Step 3007: The sub-process terminates.

Figure 9:
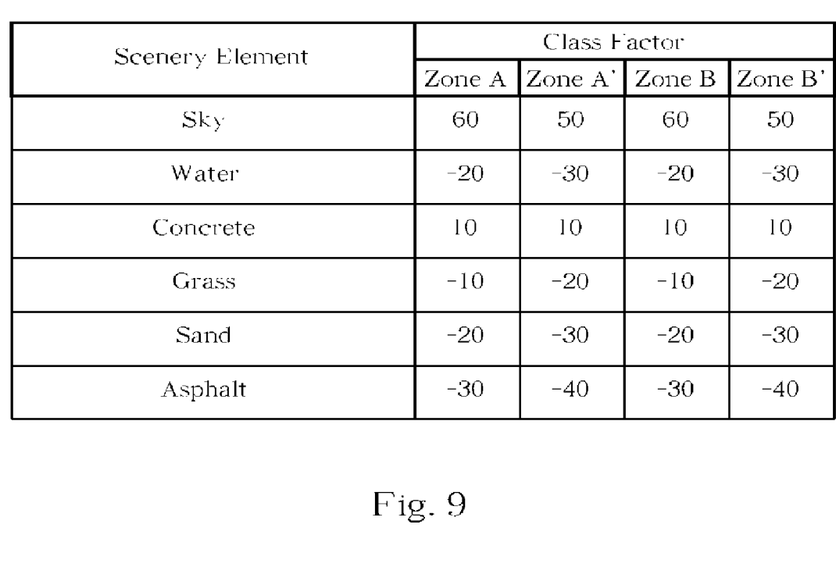
FIG. 9 Illustrates an example of an expanded class factor look-up table.

In an alternative embodiment, the above method is implemented as described, with the exception that each image zone has a separate class factor look-up table, or separately defined values in a single look-up table as shown by example in FIG. 9.

Figure 10:
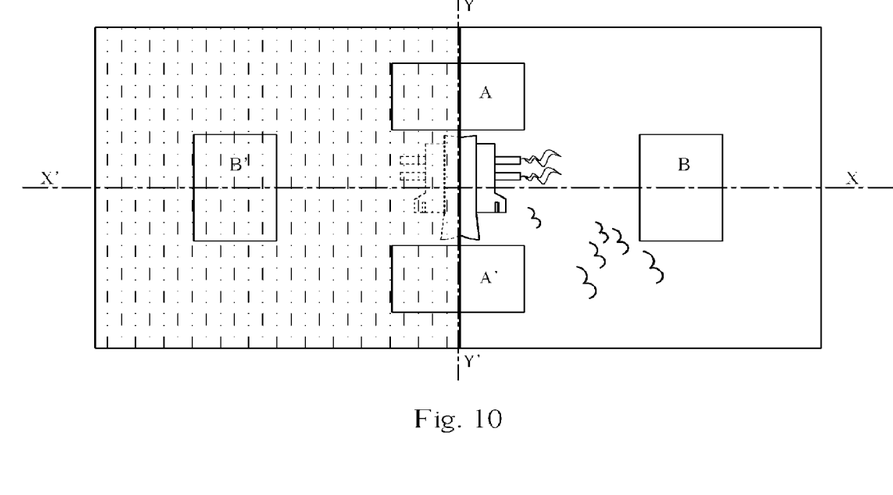
FIG. 10 Is an example portrait mode image showing a scene with analysis zones superimposed.

Re-working the example given by FIG. 4 using the values of FIG. 9, i.e. class probability of 80% sky for zone A×60=4800, class probability of 85% sky for zone A'×50=4250, class probability of 75% sky for zone B×60=4500 and class probability of 65% grass for zone B'×(−20)=3250, it can be seen that no significant difference is made in this case (the axis weighting potential of axis Y-Y' swinging from −300 to +550, but this still being small compared to the weighting potential of the dominant axis (4800)). However, bias in the class factor values becomes more significant when applied to images with less pronounced zone polarities. Consider FIG. 10 for example; this seascape may contain very little contrast between sky and sea elements if, for example, an overcast sky reflects on calm water, hence zone probability rate returns could be very similar for zones B & B' (zone probabilities for A & A' should be virtually identical in this example). To the human observer, it's obvious that axis X-X' should be placed in the vertical plane, however, if marginal class probability ratings are returned by zone analysis, say 65% sky for zone B and 50% sky for zone B' (narrowly exceeding a 48% probability rating for water, then using the common values of FIG. 5, zone probability ratings of 3900 and 3000 respectively will result. If a weighting potential of 900 for axis X-X' does not exceed the axis differential threshold, then the image will not be re-orientated. Consider the same class probability values treated with the class rating values given by FIG. 9: zone probability ratings of 3900 and 2500 respectively will result, and hence a weighting potential of 1400 can be assigned to axis X-X'. Balancing the class factor values and thresholds in this way allows the method to be tuned for higher sensitivity and to be better able to process images with marginal contrast as described.

In another alternative embodiment, the decision point regarding the dominant class in a zone is shifted. Whereas in the preferred embodiment the dominant class is decided when the image analysis algorithm returns the class probability ratings and only the selected dominant class treated with the appropriate class factor value, in an alternative embodiment, the ratings for all classes are multiplied by the appropriate class factor (either universal or zone specific) and then the dominant class or zone probability rating, being the largest value, is selected.

Figure 11:
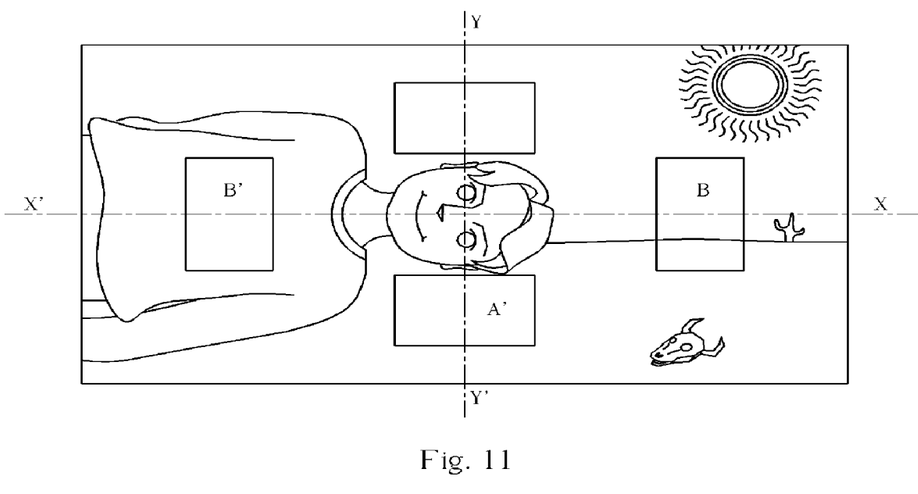
FIG. 11 Is an example landscape mode image showing a scene with human facial features and analysis zones superimposed.

As a further refinement, the outputs of both analysis techniques may be stored and compared. This additional layer of sophistication allows the method to better consider the relative significance of, for example, large but not dominant facial features against that of background scenery. Consider FIG. 11, which although unusual is entirely possible and requires a balanced view to be taken accounting for both background scenery (image zone analysis) and foreground features (facial feature analysis), in order to determine correct orientation of the image. In this case it is most probable that the image should be re-orientated to portrait mode i.e. long axis X-X' vertical, and a human observer could discern that the background scenery is a backdrop image. Whereas the method may not be capable of making such differentiations in a basic embodiment, carefully optimized threshold settings (some or all of which may be adaptive, i.e. automatically adjusted according historical data relating to such factors as, for example, user input) allow correct analysis and re-orientation of a majority of commonly occurring images.

Figure 12:
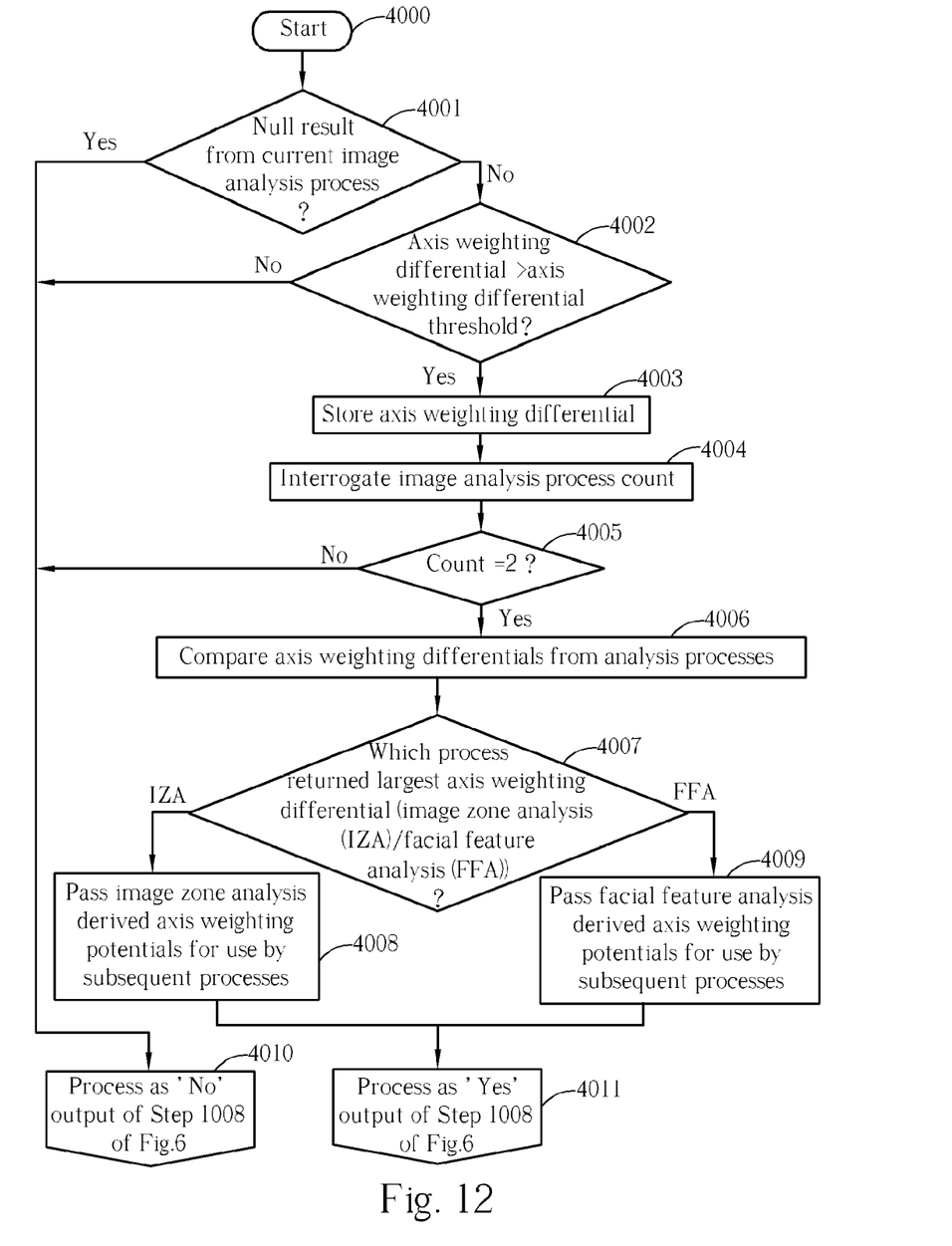
FIG. 12 Is a flow diagram detailing an expansion of the process corresponding to that carried out by step 1008 of FIG. 6 in the preferred embodiment, according to an alternative embodiment.

FIG. 12 shows a flow diagram detailing an expansion of the process corresponding to that carried out by step 1008 of FIG. 6 in the preferred embodiment. The expanded process is demarcated into the following steps:

Step 4000: The expanded process starts.

Step 4001: If the current image analysis sub-process has returned a null result, then the remainder of the expanded process is omitted and the expanded process proceeds to step 4010 (thus effectively to step 1009 (FIG. 6) of the present invention process). Otherwise the expanded process proceeds to step 4002.

Step 4002: A decision is made regarding whether the current image analysis sub-process is eligible to contribute to the re-orientation process, i.e. is the derived axis weighting differential above the axis weighting differential threshold? If the axis weighting differential is below the axis weighting differential threshold then the expanded process proceeds to step 4010 (thus effectively to step 1009 (FIG. 6) of the present invention process). Otherwise the expanded process proceeds to step 4003.

Step 4003: The axis weighting differential is stored for future reference.

Step 4004: The image analysis process count is interrogated to determine if both image analysis processes have been applied to the current image.

Step 4005: If the count=2, then the expanded process proceeds to step 4006. Otherwise the expanded process proceeds to step 4010 (thus effectively to step 1009 (FIG. 6) of the present invention process).

Step 4006: The axis weighting differentials of the two image analysis processes are compared. (Note that one or both of these may be zero if null returns have occurred.)

Step 4007-9: The axis weighting potentials of the image analysis process returning the largest axis weighting differential are passed on for use by subsequent processes (thus effectively to step 1010 (FIG. 6) of the present invention process), via steps 4008 & 4011 in the case of image zone analysis or steps 4009 & 4011 in the case of facial feature analysis.

Step 4010: This step is equivalent to the 'Yes' output of step 1008 of the preferred embodiment process (FIG. 6 refers).

Step 4011: This step is equivalent to the 'No' output of step 1008 of the preferred embodiment process (FIG. 6 refers).

To refine the method still further, if either analysis method returned values that were significant (i.e. above the relevant sub-process significance threshold) but leading to an axis weighting differential below the axis weighting differential threshold, they may still be considered and be used to launch further analysis processes in more sensitive embodiments. For example, in the case of FIG. 11, depth of field analysis in addition to the preferred embodiment analysis techniques would reveal the nature of the background.

Whereas in prior art image-editing environments, images are generally loaded in landscape mode by default, presenting the user with the inconvenience of manually correcting the orientation of images (a task which users may reasonably expect to be carried out by the processing capabilities of the image processing device, which in many cases will be an averagely powerful personal computer (PC)), the present invention provides 'intelligent' re-orientation of digital images.

Intelligent re-orientation of digital images is realized in the present invention by first analyzing an image and determining whether or not the image requires re-orientation. Processes used to analyze images include an image zone analysis process and a facial feature analysis process. The facial feature analysis process is used to detect the presence of facial features and determine the significance of said features in the context of the image, and the image zone analysis process is used to analyze image elements other than those detected by facial feature analysis. The above processes generate information that is subsequently used to both establish the requirement for re-orientation of an image, and also to determine the direction (clockwise or anti-clockwise) and scale (generally 90° or 180°) of correction need to render an image 'the right way up' with respect to the user's view.

The present invention method may be initiated at various points in the treatment of 'new' images, i.e. images that have not previously been treated by an instance of the present invention method. These points include when the image is loaded into an instance of an image-editing environment featuring the present invention method for the first time, when the image is first opened and when the image is first selected for previewing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for re-orientating digital images comprising the following steps:

analyzing an image stored in a computer readable media and determining an image re-orientation requirement according to an image analysis output, wherein the analyzing step includes an image analysis process to determine an axis weighting potential for a first axis and an axis weighting potential for a second axis;

determining a direction of re-orientation of the image according to the image re-orientation requirement, wherein the re-orientation requirement is determined according to the axis weighting potentials for the first and second axes; and re-orientating the image according to the determined direction of re-orientation.

2. The method of claim 1, wherein the analyzing step includes comparing properties of the image to threshold values and deriving comparison values, determining whether an image analysis process can be omitted according to the comparison values and if so, determining a re-orientation requirement according to the comparison values.

3. The method of claim 1, wherein the first and second axes are mutually perpendicular.

4. The method of claim 1, wherein the image analysis process is an image zone analysis process comprising the following steps:

analyzing a plurality of image zones of the image to realize a plurality of zone element values;

comparing the zone element values returned from the analyzing step to threshold values and determining a class probability rating for each image element class of a plurality of image element classes for each image zone;

selecting the image element class with the highest class probability rating for each image zone;

comparing the highest class probability rating for each image zone to a threshold value and, if the class probability ratings are greater than the threshold value, generating a zone potential rating for each image zone according to the probability rating for the selected image element class and a table of predetermined factors; and calculating an axis weighting potential for the first axis and the second axis of the image from the corresponding zone potential ratings.

5. The method of claim 1, wherein the image analysis process is an image zone analysis process comprising the following steps:

analyzing a plurality of image zones of the image to realize a plurality of zone element values;

comparing the zone element values returned from the analyzing step to threshold values and determining a class probability rating for each image element class of a plurality of image element classes for each image zone;

comparing the class probability ratings for each image zone to a threshold value and, if the class probability ratings for each image zone are greater than the threshold value, generating a zone potential rating for each image zone by multiplying the class probability rating of each image element class by corresponding values for each image element class stored in a table of predetermined factors and selecting the image element class with the highest class probability rating; and calculating an axis weighting potential for the first axis and the second axis of the image from the corresponding zone potential ratings.

6. The method of claim 1, wherein the image analysis process is a facial feature analysis process comprising the following steps:

analyzing the image to determine the size and orientation of facial features, and to derive a significance value for the facial features; and comparing the significance value to a threshold value and, if the significance value is greater than the threshold value, calculating a weighting potential for the first axis and the second axis of the image according to the size and orientation of the facial features.

7. The method of claim 1, wherein the image analysis process comprises an image zone analysis process and a facial feature analysis process.

8. The method of claim 7, wherein the image analysis process includes comparing an output of one of the processes to a threshold value and deriving a comparison value, and determining whether the other process can be omitted according to the comparison value.

9. A method for re-orientating digital images comprising the following steps:

analyzing an image stored in a computer readable media by an image analysis process comprising an image zone analysis process for determining an axis weighting potential for a first axis and an axis weighting potential for a second axis, an image re-orientation requirement being determined according to the axis weighting potentials for the first and second axes;

determining a direction of re-orientation of the image according to the re-orientation requirement, the direction of re-orientation of the image being determined by comparing axis weighting potentials of the first and second axes to determine a dominant axis and determining the direction of re-orientation of the image such that the dominant axis will appear in a vertical viewing plane according to the axis weighting potential of the dominant axis; and re-orientating the image according to the determined direction of re-orientation.

10. The method of claim 9, wherein the analyzing step includes comparing properties of the image to threshold values and deriving comparison values, determining whether an image analysis process can be omitted according to the comparison values, and if so, determining a re-orientation requirement according to the comparison values.

11. The method of claim 9, wherein the first and second axes are mutually perpendicular.

12. The method of claim 9, wherein the image zone analysis process comprises the following steps:

analyzing a plurality of image zones of the image to realize a plurality of zone element values;

comparing the zone element values returned from the analyzing step to threshold values and determining a class probability rating for each image element class of a plurality of image element classes for each image zone;

selecting the image element class with the highest class probability rating for each image zone;

comparing the highest class probability rating for each image zone to a threshold value and, if the class probability ratings are greater than the threshold value, generating a zone potential rating for each image zone according to the probability rating for the selected image element class and a table of predetermined factors; and calculating an axis weighting potential for the first axis and the second axis of the image from the corresponding zone potential ratings.

13. The method claim 9, wherein the image zone analysis process comprises the following steps:

analyzing a plurality of image zones of the image to realize a plurality of zone element values;

comparing the zone element values returned from the analyzing step to threshold values and determining a class probability rating for each image element class of a plurality of image element classes for each image zone;

comparing the class probability ratings for each image zone to a threshold value and, if the class probability ratings for each image zone are greater than the threshold value, generating a zone potential rating for each image zone by multiplying the class probability rating of each image element class by corresponding values for each image element class stored in a table of predetermined factors and selecting the image element class with the highest class probability rating; and calculating an axis weighting potential for the first axis and the second axis of the image from the corresponding zone potential ratings.

14. The method of claim 9, wherein the image analysis process further comprises a facial feature analysis process having the following steps:

analyzing the image to determine the size and orientation of facial features, and to derive a significance value for the facial features; and comparing the significance value to a threshold value and, if the significance value is greater than the threshold value, calculating a weighting potential for the first axis and the second axis of the image according to the size and orientation of the facial features.

15. The method of claim 14, wherein the image analysis process includes comparing an output of one of the processes to a threshold value and deriving a comparison value, and determining whether the other process can be omitted according to the comparison value.

16. The method of claim 9, wherein in the analyzing step, the image re-orientation requirement is derived by comparing the outputs of a facial feature analysis process and an image zone analysis process with threshold values to determine an order of significance for each process, and using axis weighting potential values from a most significant process to determine the image re-orientation requirement.

17. A method for re-orientating digital images comprising the following steps:

analyzing an image stored in a computer readable media and determining an image re-orientation requirement according to an image analysis output;

determining a direction of re-orientation of the image according to the re-orientation requirement, wherein the direction of re-orientation of the image is determined by comparing axis weighting potentials of the first and second axes to determine a dominant axis and the direction of re-orientation of the image is determined such that the dominant axis will appear in a vertical viewing plane according to the axis weighting potential of the dominant axis; and re-orientating the image according to the determined direction of re-orientation.

* * * * *